(12) United States Patent
Kumazawa et al.

(10) Patent No.: US 9,670,914 B2
(45) Date of Patent: Jun. 6, 2017

(54) CHECK VALVE FOR COMPRESSOR (71) Applicant: KABUSHIKI KAISHA TOYOTA JIDOSHOKKI, Aichi-ken (JP)

(72) Inventors: Shingo Kumazawa, Aichi-ken (JP); Kenji Yamamoto, Aichi-ken (JP); Noriaki Satake, Aichi-ken (JP); Masayoshi Kozawa, Aichi-ken (JP)

(73) Assignee: KABUSHIKI KAISHA TOYOTA JIDOSHOKKI, Aichi-Ken ( * ) Notice: Subject to any disclaimer, the term of this patent is extended or adjusted under 35 U.S.C. 154(b) by 13 days.

(21) Appl. No.: 14/585,807

(22) Filed: Dec. 30, 2014

(65) Prior Publication Data
US 2015/0211500 A1    Jul. 30, 2015

(30) Foreign Application Priority Data

Jan. 30, 2014   (JP) .................................. 2014-015611

(51) Int. Cl.
F04B 53/10      (2006.01)
F04B 1/18       (2006.01)
(Continued)

(52) U.S. Cl.
CPC ............ F04B 1/182 (2013.01); F16K 15/026 (2013.01); F16K 17/0433 (2013.01);
(Continued)

(58) Field of Classification Search
CPC ......... Y10T 137/7935; Y10T 137/7925; F16K 15/026; F04B 27/1009; F04B 1/182
(Continued)

(56) References Cited

U.S. PATENT DOCUMENTS

2006/0037647 A1    2/2006  Okuda et al.
2011/0139273 A1    6/2011  Park et al.

FOREIGN PATENT DOCUMENTS

CN    102124224    7/2011
EP    1 059 446    12/2000
(Continued)

OTHER PUBLICATIONS

EPO Translation of JP2006177167A Mar. 22, 2016 pp. 1-5.*
(Continued)

*Primary Examiner* — Kevin Lee
*Assistant Examiner* — P. Macade Nichols
(74) *Attorney, Agent, or Firm* — Greenblum & Bernstein (57) ABSTRACT

In a check valve for a compressor, a valve element includes an abutting surface and an outer circumferential surface. A valve hole includes a large-diameter portion and a small-diameter portion. A communicating window has such a shape that an opening area thereof gradually becomes larger with increasing distance from a valve seat. The check valve has an open state, a fully closed state, and a buffering state. When the abutting surface separates from the large-diameter portion and the outer circumferential surface opens the communicating window, the open state is defined. When the abutting surface closes the large-diameter portion and the outer circumferential surface interrupts communication through the communicating window, the fully closed state is defined. When the abutting surface separates from the large-diameter portion and the outer circumferential surface interrupts communication through the communicating window, the buffering state is defined. The hunting phenomenon is suppressed.

3 Claims, 3 Drawing Sheets (51) Int. Cl.
*F16K 17/04* (2006.01)
*F16K 15/02* (2006.01)

(52) U.S. Cl.
CPC ...... *Y10T 137/774* (2015.04); *Y10T 137/7925* (2015.04); *Y10T 137/7929* (2015.04)

(58) Field of Classification Search
USPC .................................. 137/540, 543.19, 538
See application file for complete search history.

(56) References Cited

FOREIGN PATENT DOCUMENTS

| | | |
|---|---|---|
| JP | 2000-346217 | 12/2000 |
| JP | 2006-57682 | 3/2006 |
| JP | 2006-077731 | 3/2006 |
| JP | 2006-177167 | 7/2006 |
| JP | 4329645 | 9/2009 |
| JP | 2013-050123 | 3/2013 |
| JP | 2013-204563 | 10/2013 |
| KR | WO 2010018944 A2 * 2/2010 .......... F04B 27/1009 |

OTHER PUBLICATIONS

Office Action issued in Korea Counterpart Patent Appl. No. 10-2015-0009717, dated Jun. 21, 2016.

Office Action issued in China Counterpart Patent Appl. No. 201510050326.X, dated Jul. 25, 2016.

Office Action issued in Japan Counterpart Patent Appl. No. 2014-015611, dated Mar. 14, 2017.

* cited by examiner

CHECK VALVE FOR COMPRESSOR

This nonprovisional application is based on Japanese Patent Application No. 2014-015611 filed on Jan. 30, 2014 with the Japan Patent Office, the entire contents of which are hereby incorporated by reference.

BACKGROUND OF THE INVENTION

Field of the Invention

The present invention relates to a check valve used in a compressor.

Description of the Background Art

A variable capacity-type compressor is known. This compressor includes a check valve on a discharge passage. In the compressor including the check valve, when a high-pressure refrigerant gas is discharged from a discharge port to a discharge chamber while pushing away a discharge valve, the refrigerant gas is likely to produce pulsation. When a valve element of the check valve is pressed by the pulsating refrigerant gas, the valve element is vibrated and the noise caused by this vibration of the valve element propagates through an external refrigerant circuit to the outside, which may cause undesired sound.

Japanese Patent Laying-Open No. 2000-346217 discloses a compressor including a check valve. This check valve includes a valve housing having a communicating port. An opening area of the communicating port is less than proportional to a lift length of a valve element moving in a direction away from a valve seat. This document describes that since a large amount of a fluid in a flow path does not flow out when the lift length is small, occurrence of vibration caused by repeated opening and closing of the valve element (hunting phenomenon) is suppressed, the abnormal noise and vibration are less likely to occur, and the pressure loss can also be reduced.

When a flow rate of a refrigerant is extremely low, it becomes difficult to suppress the hunting phenomenon of the valve element. Accordingly, an object of the present invention is to provide a check valve for a compressor in which the hunting phenomenon of a valve element can be sufficiently suppressed and the operation of the valve element can be further stabilized.

SUMMARY OF THE INVENTION

A check valve for a compressor according to the present invention includes: a valve seat arranged on a refrigerant flow path of a compressor and having a valve hole through which a refrigerant passes; a valve element that is movable in a direction contacting with and leaving from the valve seat; a biasing member for biasing the valve element in a direction in which the valve element comes close to the valve seat; a valve housing in which a valve chamber in communication with the valve hole is formed and in which the valve element and the biasing member are accommodated; and a communicating window formed in a circumferential wall of the valve housing and forming a part of the refrigerant flow path. The valve hole includes a small-diameter portion and a large-diameter portion provided more downstream than the small-diameter portion and having a flow path cross-sectional area larger than that of the small-diameter portion. The valve element includes an abutting surface for closing the large-diameter portion of the valve hole when the valve element is seated at the valve seat, and an outer circumferential surface guided by the circumferential wall and interrupting communication through the communicating window. The communicating window has such a shape that an opening area thereof gradually becomes larger with increasing distance from the valve seat. The check valve has an open state, a fully closed state, and a buffering state. When the abutting surface separates from the large-diameter portion of the valve hole and the outer circumferential surface opens the communicating window, the open state is defined. When the abutting surface closes the large-diameter portion of the valve hole and the outer circumferential surface interrupts communication through the communicating window, the fully closed state is defined. When the abutting surface separates from the large-diameter portion of the valve hole and the outer circumferential surface interrupts communication through the communicating window, the buffering state is defined.

According to the check valve for the compressor described above, the hunting phenomenon of the valve element can be sufficiently suppressed and the operation of the valve element can be further stabilized.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment will be described hereinafter with reference to the drawings. When the number, an amount or the like is mentioned, the scope of the present invention is not necessarily limited to that number, that amount or the like, unless otherwise specified. The same or corresponding components are denoted by the same reference numerals, and redundant description will not be repeated.

(Compressor 100)

Figure 1:
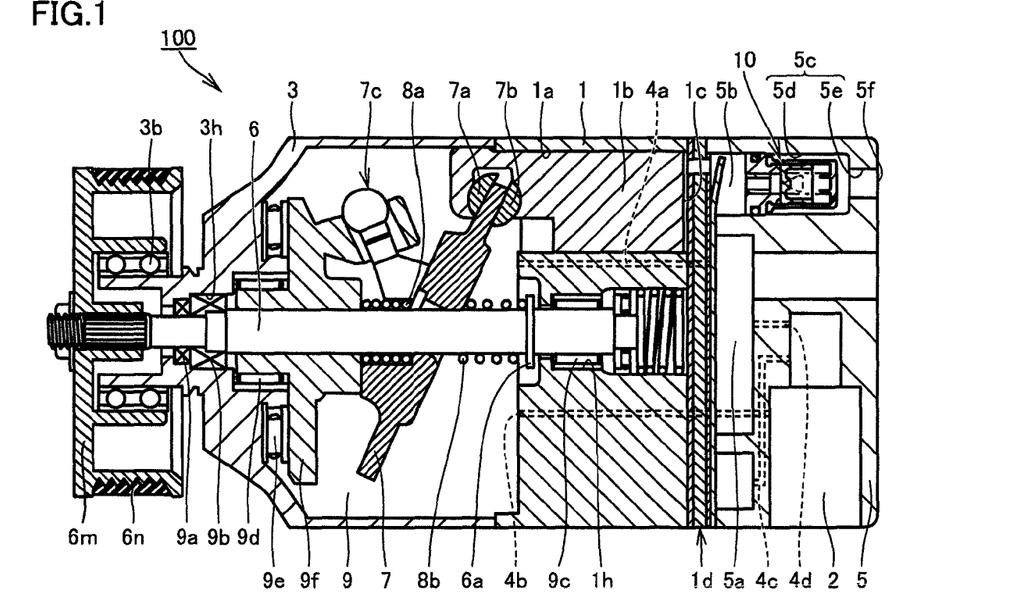
FIG. 1 is a cross-sectional view showing a compressor including a check valve according to an embodiment.

FIG. 1 is a cross-sectional view showing a variable capacity-type swash plate compressor 100 (hereinafter referred to as "compressor"). A check valve 10 for the compressor according to the present embodiment (hereinafter referred to as "check valve 10") is assembled to this compressor 100 and functions as a differential pressure control valve (the details will be described below). The compressor 100 includes a cylinder block 1, a front housing 3 and a rear housing 5.

The cylinder block 1 is sandwiched between the front housing 3 and the rear housing 5. Inside the cylinder block 1, a plurality of cylinder bores 1a are concentrically provided at equiangular intervals. The cylinder block 1 and the front housing 3 form a crank chamber 9 therein.

The cylinder block 1 has a shaft hole 1$h$ and the front housing 3 has a shaft hole 3$h$. A drive shaft 6 is rotatably supported in the shaft holes 1$h$ and 3$h$ by a shaft seal device 9$a$ and bearing devices 9$b$ and 9$c$. The front housing 3 is provided with a pulley 6$m$ through a bearing device 3$b$, and the pulley 6$m$ is fixed to the drive shaft 6. A belt 6$n$ driven by an engine or a motor of a vehicle is wound around the pulley 6$m$.

A lug plate 9$f$ and a swash plate 7 are provided inside the crank chamber 9. The drive shaft 6 is pressed into the lug plate 9$f$ and is inserted into the swash plate 7. Bearing devices 9$d$ and 9$e$ are provided between the lug plate 9$f$ and the front housing 3. An inclination angle reducing spring 8$a$ is provided between the lug plate 9$f$ and the swash plate 7. The lug plate 9$f$ and the swash plate 7 are connected by a link mechanism 7$c$ for supporting the swash plate 7 such that an inclination angle is variable.

A circlip 6$a$ is fixed to the drive shaft 6. A return spring 8$b$ is provided between the circlip 6$a$ and the swash plate 7. One piston 1$b$ is housed in each of the plurality of cylinder bores 1$a$. A pair of shoes 7$a$ and 7$b$ are provided between each piston 1$b$ and the swash plate 7. Wobble movement of the swash plate 7 is converted into the reciprocating movement of each piston 1$b$ by the shoes 7$a$ and 7$b$.

A valve unit 1$d$ is provided between the cylinder block 1 and the rear housing 5. Each cylinder bore 1$a$ forms a compression chamber 1$c$ between the piston 1$b$ and the valve unit 1$d$. A suction chamber 5$a$ and an annular discharge chamber 5$b$ are provided inside the rear housing 5. A refrigerant gas (fluid) is supplied to the suction chamber 5$a$. When the piston 1$b$ is in the suction phase, the refrigerant gas in the suction chamber 5$a$ is sucked into the compression chamber 1$c$. When the piston 1$b$ is in the discharge phase, the refrigerant gas in the compression chamber 1$c$ is compressed and discharged into the discharge chamber 5$b$.

The crank chamber 9 and the suction chamber 5$a$ are connected by a passage 4$a$. The crank chamber 9 and the discharge chamber 5$b$ are connected by passages 4$b$ and 4$c$. A capacity control valve 2 is housed in the rear housing 5. The capacity control valve 2 is in communication with the passages 4$b$ and 4$c$, and is in communication with the suction chamber 5$a$ by a pressure detecting passage 4$d$.

The capacity control valve 2 opens and closes the passages 4$b$ and 4$c$ based on a flow rate differential pressure or the like of the refrigerant gas detected by the pressure detecting passage 4$d$. The high-pressure refrigerant gas in the discharge chamber 5$b$ is supplied to the crank chamber 9 through the passages 4$b$ and 4$c$. The pressure in the crank chamber 9 is adjusted to a desired value, and thereby, the inclination angle of the swash plate 7 changes and a desired discharge capacity is obtained.

A discharge passage 5$c$ (refrigerant flow path) is formed inside the rear housing 5. The discharge passage 5$c$ is in communication with the discharge chamber 5$b$ and is open to a rear surface of the rear housing 5. The discharge passage 5$c$ has a large-diameter hole portion 5$d$ recessed rearward from an inner wall surface of the discharge chamber 5$b$, and a small-diameter hole portion 5$e$ that causes the large-diameter hole portion 5$d$ to be in communication with an opening 5$f$. The check valve 10 described next is disposed inside the large-diameter hole portion 5$d$. When the compressor 100 is mounted on an air conditioner for the vehicle, the opening 5$f$ on the rear surface side of the rear housing 5 in the discharge passage 5$c$ is connected to a not-shown condenser.

(Check Valve 10)

Figure 2:
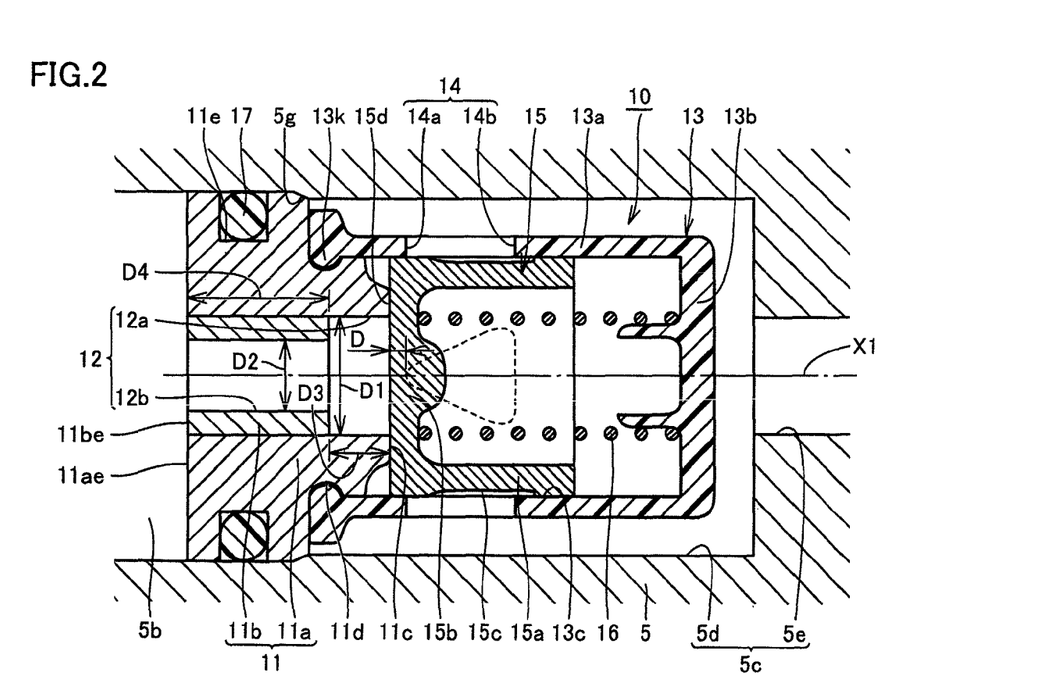
FIG. 2 is a cross-sectional view showing the check valve according to the embodiment.

FIG. 2 is a cross-sectional view showing the check valve 10. The check valve 10 includes a valve seat 11, a valve housing 13 and a valve element 15. The check valve 10 is formed by assembling and unitizing these components. With an O-ring 17 fit into a recessed portion 11$e$ of the valve seat 11, the check valve 10 is inserted into the large-diameter hole portion 5$d$ from the discharge chamber 5$b$ side. The large-diameter hole portion 5$d$ is provided with a step portion 5$g$.

With an outer circumferential surface of the valve seat 11 abutting the step portion 5$g$, the check valve 10 is retained by a not-shown circlip and the like. The check valve 10 makes a separation between the discharge chamber 5$b$ and the discharge passage 5$c$. The discharge chamber 5$b$ is located on the upstream side of the discharge passage 5$c$, and a portion of the large-diameter hole portion 5$d$ opposite to the discharge chamber 5$b$ with the valve seat 11 interposed therebetween is located on the downstream side of the discharge passage 5$c$. Hereinafter, the configurations of the valve seat 11, the valve housing 13 and the valve element 15 will be described in detail in this order.

(Valve Seat 11)

The valve seat 11 has a cylindrical portion 11$a$ and a cylindrical portion 11$b$, and is arranged on the discharge passage 5$c$ in the compressor 100 (FIG. 1). An inner circumferential surface of the cylindrical portion 11$a$ has a size and a shape corresponding to an outer circumferential surface of the cylindrical portion 11$b$, and the cylindrical portion 11$b$ is arranged on the inner side of the cylindrical portion 11$a$. The cylindrical portions 11$a$ and 11$b$ are fabricated as separate members, and then, are integrated. The cylindrical portions 11$a$ and 11$b$ can also be integrally formed by a machining method or the like.

An end face 11$ae$ of the cylindrical portion 11$a$ located on the discharge chamber 5$b$ side is flush with an end face 11 be of the cylindrical portion 11$b$ located on the discharge chamber 5$b$ side. A valve hole 12 through which the compressed refrigerant gas (refrigerant) passes is provided inside the valve seat 11. The valve hole 12 causes the discharge chamber 5$b$ to be in communication with the downstream side of the discharge passage 5$c$. The valve hole 12 includes a large-diameter portion 12$a$ and a small-diameter portion 12$b$.

The large-diameter portion 12$a$ is a portion formed by a portion of the inner circumferential surface of the cylindrical portion 11$a$ that is not covered with the cylindrical portion 11$b$ (that is exposed). The small-diameter portion 12$b$ is a portion formed by an inner circumferential surface of the cylindrical portion 11$b$. The large-diameter portion 12$a$ is located more downstream than the small-diameter portion 12$b$ in the flow direction of the refrigerant gas. A diameter D1 of the large-diameter portion 12$a$ is larger than a diameter D2 of the small-diameter portion 12$b$, and the large-diameter portion 12$a$ has a flow path cross-sectional area larger than that of the small-diameter portion 12$b$.

The diameter D1 is, for example, 4 mm to 8 mm and the diameter D2 is, for example, 3 mm to 6 mm. In a direction of an axis line X1, a length D3 of the large-diameter portion 12$a$ is shorter than a length D4 of the small-diameter portion 12$b$. The length D3 of the large-diameter portion 12$a$ in the direction of the axis line X1 can be set at, for example, a value equal to or larger than (diameter D1−diameter D2)/2. When the diameter D1 is 5 mm and the diameter D2 is 3 mm, the length D3 can be set at a value equal to or larger than 1 mm.

An outer circumferential surface of the cylindrical portion 11a is provided with a recessed portion 11d for engaging with an end 13k of the valve housing 13, and the recessed portion 11e into which the O-ring 17 is fit. A seat surface 11c is formed at a tip of the cylindrical portion 11a pointing to the downstream side. The seat surface 11c is parallel to a plane orthogonal to the axis line X1.

(Valve Housing 13)

The valve housing 13 includes a circumferential wall 13a and a bottom portion 13b, and has a valve chamber 13s (see FIG. 3) therein. The circumferential wall 13a has a cylindrical shape having the axis line X1 as a center axis, and the bottom portion 13b has a disc shape closing a rear edge of the circumferential wall 13a. The end 13k of the valve housing 13 externally engages with the recessed portion 11d of the cylindrical portion 11a, and thereby, the valve housing 13 is fixed to the valve seat 11 and the valve chamber 13s becomes in communication with the valve hole 12. The valve element 15 and a spring 16 are housed in the valve chamber 13s.

A plurality of communicating windows 14 for causing the valve chamber 13s to be in communication with the outside of the circumferential wall 13a are formed somewhere in the circumferential wall 13a in the direction of the axis line X1. The plurality of communicating windows 14 are spaced apart from one another and aligned along the circumference of a circle with the axis line X1 being the center. Each communicating window 14 has an isosceles triangular shape with rounded corners. A window end portion 14a of the communicating window 14 located closest to the valve seat 11 forms a vertex of this triangle. A window bottom portion 14b of the communicating window 14 located farthest from the valve seat 11 forms a bottom portion of this triangle.

Each communicating window 14 is a portion for allowing the refrigerant gas flown from the valve hole 12 into the valve chamber 13s to flow out to the outside of the valve chamber 13s, and can form a part of the refrigerant flow path (discharge passage) in the compressor 100 (FIG. 1) (or can function as a part of the refrigerant flow path). As long as each communicating window 14 has such a shape that an opening area thereof gradually becomes larger with increasing distance from the valve seat 11, the shape of the communicating window 14 is not limited to the isosceles triangular shape, and may be a triangular shape such as a equilateral triangular shape and a right triangular shape. Each side of the triangular shape may be a straight line or a curved line. Each vertex of the triangular shape may be bent or curved.

(Valve Element 15)

The valve element 15 is arranged inside the valve chamber 13s of the valve housing 13 and is located on the downstream side of the discharge passage 5c with respect to the valve seat 11. The valve element 15 includes a cylindrical portion 15a and a disc portion 15b. The cylindrical portion 15a has a cylindrical shape having the axis line X1 as a center axis. The disc portion 15b has a disc shape closing a front edge of the cylindrical portion 15a.

A minute clearance that allows the valve element 15 to slide in the direction of the axis line X1 is ensured between an outer circumferential surface 15c of the cylindrical portion 15a of the valve element 15 and an inner circumferential surface 13c of the circumferential wall 13a of the valve housing 13. Due to the clearance, the valve element 15 can be guided by the valve housing 13 and move in a direction contacting with and leaving from the valve seat 11. The spring 16 (biasing member) is provided between the disc portion 15b of the valve element 15 and the bottom portion 13b of the valve housing 13. The spring 16 biases the valve element 15 in a direction in which the valve element 15 comes close to the valve seat 11.

An outer diameter of the disc portion 15b of the valve element 15 is nearly equal to an inner diameter of the circumferential wall 13a of the valve housing 13. An abutting surface 15d is formed at a front end of the disc portion 15b of the valve element 15, and the outer circumferential surface 15c guided by the circumferential wall 13a of the valve housing 13 is formed around the cylindrical portion 15a of the valve element 15. The abutting surface 15d is also parallel to the plane orthogonal to the axis line X1. When the valve element 15 is displaced frontward and the abutting surface 15d abuts the seat surface 11c, the valve element 15 is seated at the valve seat 11 and the abutting surface 15d closes the large-diameter portion 12a of the valve hole 12. At this time, the outer circumferential surface 15c of the cylindrical portion 15a of the valve element 15 closes the communicating window 14 and interrupts the communication through the communicating window 14 (fully closed state).

In the state where the valve element 15 is seated at the valve seat 11, a portion of the outer circumferential surface 15c of the valve element 15 located closest to the valve seat 11 (a portion located between the abutting surface 15d and the outer circumferential surface 15c) is distant from the window end portion 14a of the communicating window 14 by a certain distance D (D>0). The distance D is, for example, 0.5 mm to 3.0 mm.

(Operation of Compressor 100)

The operation of the compressor 100 configured as described above will be described with reference to FIGS. 3 and 4. The case of using the compressor 100 in, for example, an air conditioner for the vehicle is assumed. The discharge chamber 5b is connected to the condenser through the discharge passage 5c, the condenser is connected to an evaporator through an expansion valve, and the evaporator is connected to the suction chamber 5a. When the drive shaft 6 is rotationally driven by the engine or the like, the refrigerant gas flown into the suction chamber 5a is compressed in the compression chamber 1c and discharged into the discharge chamber 5b at a stroke amount of the piston 1b corresponding to the inclination angle of the swash plate 7.

Figure 3:
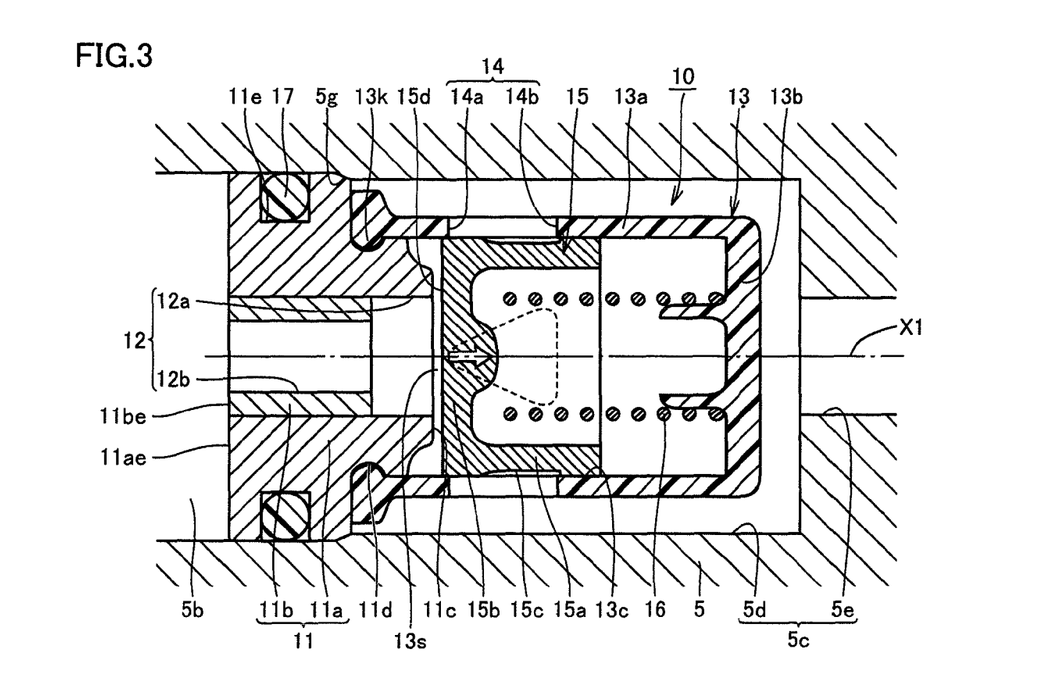
FIG. 3 is a cross-sectional view showing a state in which the check valve according to the embodiment is operating.
Figure 4:
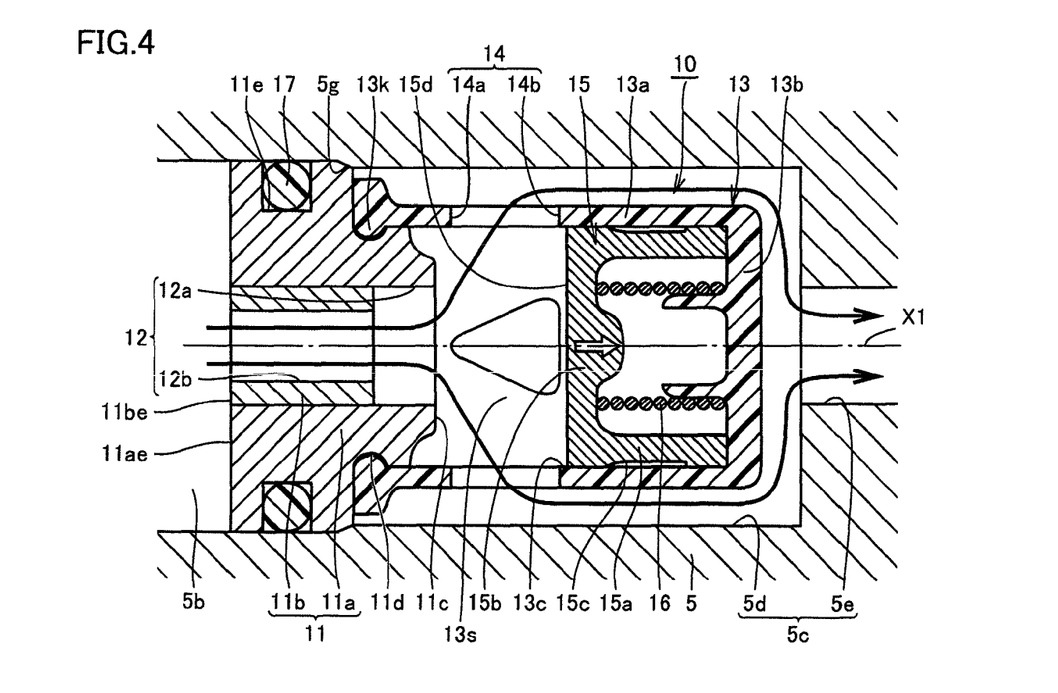
FIG. 4 is another cross-sectional view showing the state in which the check valve according to the embodiment is operating.

It is assumed that the capacity control valve 2 is actuated during this period in accordance with an instruction from a passenger to change the air-conditioning temperature, a change in the number of rotations of the engine or the like of the vehicle, and the like. When the high-pressure refrigerant gas in the discharge chamber 5b is supplied to the crank chamber 9 through the passages 4b and 4c, the inclination angle of the swash plate 7 decreases and the discharge capacity decreases. Conversely, when the high-pressure refrigerant gas in the discharge chamber 5b becomes less likely to be supplied to the crank chamber 9 through the passages 4b and 4c, the inclination angle of the swash plate 7 increases and the discharge capacity increases. As described above, the discharge capacity can be changed as appropriate in the compressor 100.

The check valve 10 operates as follows. When the inclination angle of the swash plate 7 becomes the minimum and the flow rate of the refrigerant gas discharged from the discharge chamber 5b becomes extremely low, a pressure difference between the discharge chamber 5b and the downstream side of the discharge passage 5c becomes equal to or smaller than a prescribed value $\Delta P$. By the biasing force of the spring 16, the valve element 15 is biased toward the valve seat 11 and is seated at the valve seat 11. The abutting surface 15d of the valve element 15 closes the large-diameter portion 12a of the valve hole 12 and the outer circumferential surface 15c of the valve element 15 interrupts the communication of the valve housing 13 through the communicating window 14. This state is maintained by the biasing force of the spring 16. As a result, the discharge passage 5c enters the closed state (fully closed state), and the refrigerant circulation among the compressor, the condenser, the expansion valve, and the evaporator stops.

Referring to FIG. 3, when the inclination angle of the swash plate 7 increases from the minimum, the flow rate of the refrigerant gas discharged from the discharge chamber 5b increases as well, and a pressure difference between the discharge chamber 5b and the downstream side of the discharge passage 5c exceeds the prescribed value ΔP. The biasing force of the spring 16 yields to this pressure difference, such that the valve element 15 can no longer close the valve hole 12, and the valve element 15 is guided by the valve housing 13 and separates from the valve seat 11. During a period from the state in which the valve element 15 is seated at the valve seat 11 to when the valve element 15 moves by the distance D in a direction away from the valve seat 11, each communicating window 14 is substantially closed by the outer circumferential surface 15c of the valve element 15 (buffering state). In this buffering state, only a small amount of the refrigerant gas passes through the gap between the outer circumferential surface 15c of the valve element 15 and the inner circumferential surface 13c of the valve housing 13, passes through the communicating window 14 and is discharged to the outside.

Referring to FIG. 4, with the increase in pressure difference, the valve element 15 is further pushed by the refrigerant gas passing through the valve hole 12. After the valve element 15 further moves rearward beyond the distance D, the outer circumferential surface 15c of the valve element 15 opens the communicating window 14 (open state). In this open state, the abutting surface 15d of the valve element 15 separates from the large-diameter portion 12a of the valve hole 12 and the outer circumferential surface 15c of the valve element 15 opens the communicating window 14 of the valve housing 13. When the valve element 15 is further displaced rearward and a rear end of the cylindrical portion 15a abuts the bottom portion 13b of the valve housing 13, the valve hole 12 enters the fully open state. At this time, the cylindrical portion 15a fully opens the communicating window 14. As a result, the state of the discharge passage 5c is switched to the fully open state, and the refrigerant circulation among the compressor, the condenser, the expansion valve, and the evaporator is performed. An amount of displacement of the valve element 15 from the state in which the valve element 15 is seated to when the valve element 15 abuts the bottom portion 13b of the valve housing 13 corresponds to the stroke amount (maximum amount of displacement) of the valve element 15. Although the valve element 15 is configured to abut the bottom portion 13b, the valve element 15 may abut a spring receiver protrusion formed at the bottom portion 13b, or the valve element 15 may abut a protrusion provided at a portion other than the spring receiver. In these cases, an amount of displacement of the valve element 15 from the state in which the valve element 15 is seated to when the valve element 15 abuts the aforementioned protrusions corresponds to the stroke amount (maximum amount of displacement) of the valve element 15.

A relationship between the amount of displacement of the valve element 15 and an area of the flow path (flow path area) through which the refrigerant gas can flow within the valve chamber 13s will be described with reference to FIG. 5. As shown by a line L1 in the figure, the flow path area in the valve chamber 13s changes with the amount of displacement of the valve element 15. Specifically, when the amount of displacement of the valve element 15 is zero, the flow path area in the valve chamber 13s is also zero. As the valve element 15 moves away from the seat surface 11c, the flow path area in the valve chamber 13s increases (section F1). In the section F1, the flow path area in the valve chamber 13s increases linearly by an amount corresponding to (amount of displacement of the valve element 15)×(length of an inner circumference of the circumferential wall 13a of the valve housing 13).

In a section F2, even if the valve element 15 further moves away from the seat surface 11c, the flow path area in the valve chamber 13s does not increase. This is because the aforementioned distance D (D>0) is provided in the state where the valve element 15 is seated at the valve seat 11. An area of the communicating window 14 is sufficiently larger than a cross-sectional area of the minute gap between the outer circumferential surface 15c of the valve element 15 and the inner circumferential surface 13c of the circumferential wall 13a of the valve housing 13, and thus, the flow of the refrigerant gas is limited in the section F2. Therefore, in the section F2, even if the amount of displacement of the valve element 15 increases, the flow rate of the refrigerant gas does not change sharply. A pressure difference between the valve hole 12 and the outside of the valve housing 13 does not change sharply and the hunting phenomenon hardly occurs.

When the amount of displacement of the valve element 15 is zero (in the fully closed state), a nearly closed space having a capacity corresponding to the distance D×a cross-sectional area of the valve chamber 13s is formed inside the valve chamber 13s to lead continuously to the large-diameter portion 12a. The large-diameter portion 12a and the nearly closed space having a capacity corresponding to the distance D×a cross-sectional area of the valve chamber 13s function as a damper space, and this damper space counteracts the pressure in a direction closing the valve element 15, which makes it more difficult to close the valve element 15. As the amount of displacement of the valve element 15 increases (as the communicating window 14 is opened), the damper effect of this damper space weakens gradually. This damper space functions mainly during a period from when the amount of displacement of the valve element 15 is zero to when the amount of displacement of the valve element 15 reaches the distance D, i.e., during a period of the buffering state.

When the amount of displacement of the valve element 15 becomes the same value as the distance D, the portion of the outer circumferential surface 15c of the valve element 15 located closest to the valve seat 11 (the portion located between the abutting surface 15d and the outer circumferential surface 15c) overlaps with the window end portion 14a of the communicating window 14. When the valve element 15 further moves rearward beyond the distance D, the open state is formed, and near the window end portion 14a of the communicating window 14, the valve hole 12 becomes in direct communication with the outside of the valve housing 13, and the flow path area in the valve chamber 13s increases gradually (section F3). Until the flow path area in the valve chamber 13s reaches a prescribed flow path area (described below), the flow path area in the valve chamber 13s continues to increase with the increase in amount of displacement of the valve element 15.

As described above, the communicating window 14 has a substantially isosceles triangular shape that spreads from the window end portion 14a toward the opposite side of the valve seat 11. Immediately after the amount of displacement of the valve element 15 exceeds the distance D, a rate of increase in opening area of the communicating window 14 to the increase in amount of displacement of the valve element 15 is relatively low. As the amount of displacement of the valve element 15 continues to further increase, the rate of increase in opening area (flow path area in the valve chamber 13s) to the increase in amount of displacement of the valve element 15 becomes higher. This opening area continues to increase until the abutting surface 15d of the valve element 15 overlaps with the window bottom portion 14b of the communicating window 14, and thereafter, the flow path area in the valve chamber 13s is limited by the opening area of the communicating window 14 (and/or a flow path cross-sectional area of the cylindrical portion 11b of the valve seat 11) and becomes substantially constant. Since this opening area of the communicating window 14 is relatively large, loss of the fluid flow rate can be reduced even in the case of high flow rate.

As described above, the valve hole 12 is provided with the large-diameter portion 12a and the small-diameter portion 12b, and the large-diameter portion 12a is located more downstream than the small-diameter portion 12b. The space formed inside the large-diameter portion 12a can have the damper function. Specifically, if the valve hole 12 is a merely cylindrical space and does not have the damper function, the refrigerant gas flows into the valve hole 12 relatively swiftly. This swift inflow of the refrigerant gas may induce the vibration caused by repeated opening and closing of the valve element 15 (hunting phenomenon).

The valve hole 12 in the present embodiment has the large-diameter portion 12a on the downstream side. The space formed inside the large-diameter portion 12a provides the braking force to the valve element 15. Even if the refrigerant gas flows in with a pressure exceeding the valve closing pressure and the refrigerant gas presses the valve element 15 and thus the valve element 15 tries to abruptly move toward the downstream side, the space formed inside the large-diameter portion 12a suppresses this movement of the valve element 15 due to the damper effect. The vibration caused by repeated opening and closing of the valve element 15 can be suppressed.

In a section F4, the flow path area in the valve chamber 13s is constant. The prescribed flow path area herein refers to a value limited by the flow path cross-sectional area of the cylindrical portion 11b of the valve seat 11 and/or the opening area of the communicating window 14. In the section F4, the flow path area in the valve chamber 13s does not increase even when the amount of displacement of the valve element 15 further increases.

Figure 5:
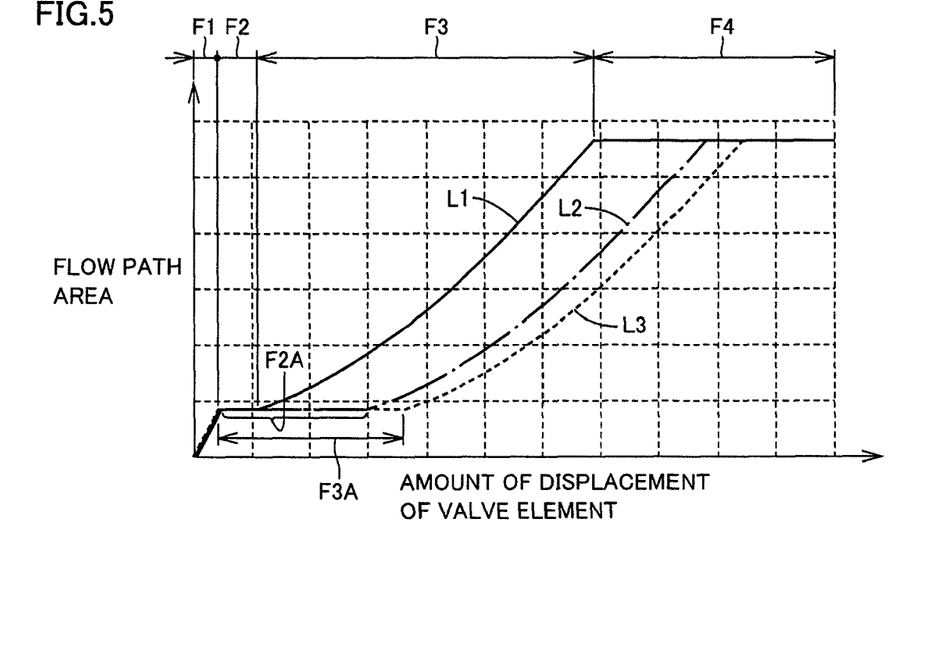
FIG. 5 is a view for describing a relationship between an amount of displacement of a valve element and an area of a flow path (flow path area) through which a refrigerant gas can flow within a valve chamber.

By increasing a value of the distance D, the aforementioned relationship changes from the relationship shown by the line L1 to the relationships shown by a line L2 and a line L3 in FIG. 5. With this, the communicating window 14 is closed and the section F2 in which the flow path area in the valve chamber 13s does not increase becomes longer as shown by a section F2A and a section F3A. It is preferable to optimize the value of the distance D depending on the usage environment of the compressor 100 such as the assumed pressure of the refrigerant gas.

Assuming, for example, that the stroke amount (maximum amount of displacement) of the valve element 15 is L [mm], the present embodiment can be configured such that the relationship of the distance D [mm]≥0.2×L is satisfied.

Alternatively, assuming that the flow path cross-sectional area of the small-diameter portion 12b of the valve hole 12 is S [mm$^2$], the present embodiment can be configured such that the relationship of the distance D [mm]≥0.035×S is satisfied. As described above, the check valve 10 according to the present embodiment can suppress the vibration caused by repeated opening and closing of the valve element 15.

Figure 6:
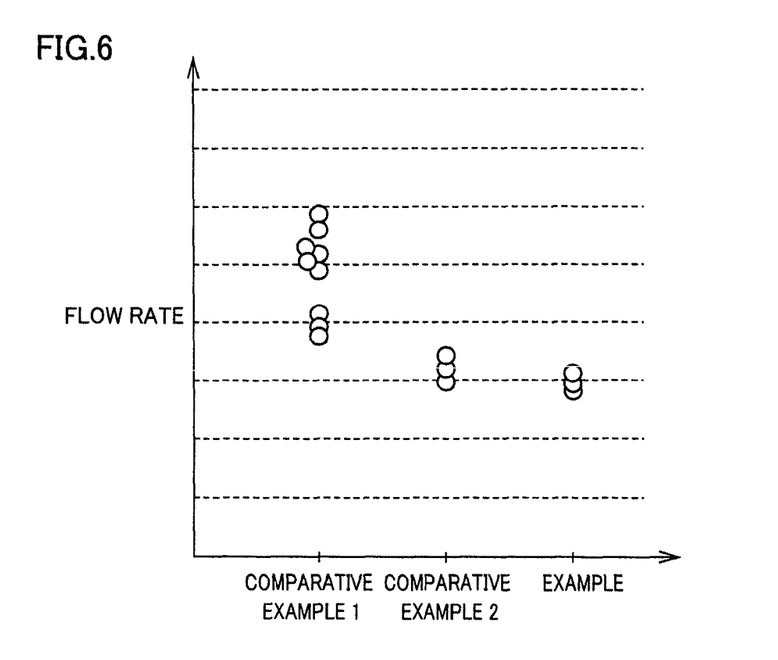
FIG. 6 is a view showing a result of an experiment conducted on the embodiment.

FIG. 6 is a view showing a result of an experiment conducted on the embodiment. In Comparative Example 1 shown in FIG. 6, the valve hole 12 is formed by a merely cylindrical space and the distance D=0. In Comparative Example 2, the valve hole 12 is formed by a merely cylindrical space and the distance D>0. Example has a configuration similar to that of the aforementioned embodiment. In Example, the valve hole 12 includes the large-diameter portion 12a and the small-diameter portion 12b, and the distance D>0.

In the configuration of Comparative Example 1, relatively large variations occurred in the flow rate of the refrigerant gas discharged from the discharge passage 5c. In the configuration of Comparative Example 2, more or less variations occurred in the flow rate of the refrigerant gas discharged from the discharge passage 5c, although they were improved as compared with those in Comparative Example 1. In the configuration of Example, more excellent result was obtained than those obtained in Comparative Examples 1 and 2. According to the check valve 10 of the embodiment, it can be seen that the variations in flow rate of the refrigerant gas can be reduced.

As described above, it is desirable that the check valve included in the variable capacity-type compressor should close the refrigerant flow path only when the flow rate of the refrigerant is extremely low. Namely, when the flow rate of the refrigerant is zero or substantially zero, the check valve closes the refrigerant flow path (valve hole). However, when a certain flow rate of the refrigerant flows, the check valve leaves the refrigerant flow path slightly open and permits the discharge of the refrigerant with the valve opening pressure maintained at a low value. As a result, the compressor desirably functions as compression means. However, when the valve opening pressure is set at a low value, the check valve is likely to close the refrigerant flow path, and as a result, the hunting phenomenon is likely to occur because the refrigerant flow path is closed even in a case other than the case of extremely low flow rate.

In the present embodiment, the large-diameter portion 12a and the nearly closed space having a capacity corresponding to the distance D×the cross-sectional area of the valve chamber 13s function as the damper space. This damper space functions mainly in the buffering state between the fully closed state and the open state (or the buffering state between the open state and the fully closed state) of the check valve 10. Even if the valve opening pressure is not set at a low value, the function of the damper space makes it difficult to close the refrigerant flow path even in a case other than the case of extremely low flow rate, and thus, the hunting phenomenon can be suppressed. As a result, the vibration of the valve element and the pulsation caused by the vibration can be effectively suppressed.

Although the embodiment of the present invention has been described, it should be understood that the embodiment disclosed herein is illustrative and not limitative in any respect. The scope of the present invention is defined by the terms of the claims, and is intended to include any modifications within the scope and meaning equivalent to the terms of the claims.

What is claimed is:

1. A check valve for a compressor, comprising:
a valve seat arranged on a refrigerant flow path of a compressor and having a valve hole through which a refrigerant passes;
a valve element that is movable in a direction contacting with and leaving from said valve seat;
a biasing member for biasing said valve element in a direction in which said valve element comes close to said valve seat;
a valve housing in which a valve chamber in communication with said valve hole is formed and in which said valve element and said biasing member are accommodated; and
a communicating window formed in a circumferential wall of said valve housing and forming a part of said refrigerant flow path, wherein
said valve hole includes a small-diameter portion and a large-diameter portion provided more downstream than said small-diameter portion and having a flow path cross-sectional area larger than that of said small-diameter portion,
said valve element includes an abutting surface for closing said large-diameter portion of said valve hole when said valve element is seated at said valve seat, and an outer circumferential surface guided by said circumferential wall and interrupting communication through said communicating window,
said communicating window has such a shape that an opening area thereof gradually becomes larger with increasing distance from said valve seat,
the check valve has an open state, a fully closed state, and a buffering state,
when said abutting surface separates from said large-diameter portion of said valve hole and said outer circumferential surface opens said communicating window, the open state is defined,
when said abutting surface closes said large-diameter portion of said valve hole and said outer circumferential surface interrupts communication through said communicating window, the fully closed state is defined, and
when said abutting surface separates from said large-diameter portion of said valve hole and said outer circumferential surface interrupts communication through said communicating window, the buffering state is defined, wherein
in the buffering state, a substantially closed space is formed by a part of an inner circumferential surface of said valve chamber, said valve element, and said valve seat, wherein said part of said inner circumferential surface of said valve chamber is devoid of apertures,
said substantially closed space having a diameter that is larger than a diameter of said large-diameter portion,
a first step surface is formed between said small-diameter portion and said large-diameter portion,
a second step surface is formed between said large diameter portion and said substantially closed space,
said substantially closed space being continuous with said large-diameter portion, and
said substantially closed space and an interior space defined by said large-diameter portion together form a damper space.

2. The check valve for a compressor according to claim 1, wherein
a window end portion defines a portion of said communicating window located closest to said valve seat, a portion of said outer circumferential surface located closest to said valve seat is distant from said window end portion by a certain distance D (D>0) in a state where said valve element is seated at said valve seat, and
L [mm] defines a stroke amount of said valve element, a relationship of said distance D [mm]≥0.2×L is satisfied.

3. The check valve for a compressor according to claim 1, wherein
a window end portion defines a portion of said communicating window located closest to said valve seat, a portion of said outer circumferential surface located closest to said valve seat is distant from said window end portion by a certain distance D (D>0) in a state where said valve element is seated at said valve seat, and
S [mm$^2$] defines the flow path cross-sectional area of said small-diameter portion, a relationship of said distance D [mm]≥0.035×S is satisfied.

* * * * *